United States Patent
Knüppel et al.

(10) Patent No.: US 7,462,148 B2
(45) Date of Patent: Dec. 9, 2008

(54) PACKAGE-TRANSFER APPARATUS

(75) Inventors: Jörg Knüppel, Schwendi (DE);
Wolfgang Rodi, Baustetten (DE); Detlev Gertitschke, Laupheim (DE)

(73) Assignee: Uhlmann Pac-Systeme GmbH & Co. KG, Laupheim (DE)

( * ) Notice: Subject to any disclaimer, the term of this patent is extended or adjusted under 35 U.S.C. 154(b) by 424 days.

(21) Appl. No.: 11/128,961

(22) Filed: May 9, 2005

(65) Prior Publication Data
US 2005/0281646 A1 Dec. 22, 2005

(30) Foreign Application Priority Data
May 14, 2004 (DE) .................. 10 2004 024 155

(51) Int. Cl.
*B31B 1/80* (2006.01)
(52) U.S. Cl. ....................... 493/315; 414/419
(58) Field of Classification Search ........... 414/416.05, 414/419; 901/12; 493/313, 315
See application file for complete search history.

(56) References Cited

U.S. PATENT DOCUMENTS

| | | | | |
|---|---|---|---|---|
| 2,997,186 A | * | 8/1961 | Terez | 414/737 |
| 3,069,035 A | * | 12/1962 | Schwarz et al. | 414/416.05 |
| 4,044,659 A | * | 8/1977 | Bardenhagen et al. | 493/48 |
| 4,574,818 A | * | 3/1986 | Pagnoni | 131/282 |
| 4,716,939 A | * | 1/1988 | Palau | 139/79 |
| 4,854,930 A | | 8/1989 | Miselli et al. | 493/315 |
| 4,871,348 A | | 10/1989 | Konaka | 493/315 |
| 4,902,192 A | * | 2/1990 | Ziegler | 414/732 |
| 5,257,888 A | * | 11/1993 | Kronseder | 414/416.06 |
| 5,529,191 A | | 6/1996 | Washeim | 209/523 |
| 7,077,619 B2 | * | 7/2006 | Corrigan | 414/744.4 |

FOREIGN PATENT DOCUMENTS

| | | |
|---|---|---|
| DE | 41 25 573 | 5/1992 |
| JP | 61232130 | 10/1996 |
| WO | 03-006214 | 1/2003 |

OTHER PUBLICATIONS

German Office Action.

* cited by examiner

*Primary Examiner*—Charles A Fox
(74) *Attorney, Agent, or Firm*—Andrew Wilford (57) ABSTRACT

A transfer apparatus has a drive disk rotatable at a transfer station about a central axis and defining an eccentric axis offset from the central axis. An inner drive shaft centered on the eccentric axis is rotatably journaled in the drive disk at the eccentric axis. An inner arm is fixed to and extends angularly from the inner drive shaft. An outer arm is pivoted at the inner-arm outer end, and a grab is pivoted on the outer-arm outer end. A drive rotates the drive disk about the central axis and thereby orbits the inner arm, the outer arm, and the grab about the central axis. An inner controller changes an inner angle formed between the inner arm and the outer arm, and an outer controller changes an outer angle formed between the grab and the outer arm.

14 Claims, 8 Drawing Sheets

PACKAGE-TRANSFER APPARATUS

FIELD OF THE INVENTION

The present invention relates to a package-transfer apparatus. More particularly this invention concerns an apparatus for moving a succession of objects or packages being delivered at a predetermined speed to a transfer station to a conveyor moving at a different speed away from the transfer station.

BACKGROUND OF THE INVENTION

In a standard production line, for instance producing blister packs of pills, the packages are advanced as a strip from a down-drawing thermoforming machine in a straight line to a station where the packages are stamped out of the strip and transferred to a conveyor that in turn leads to a machine where the packages are boxed. Ideally the output device constituted by the conveyor operates at a higher speed than the input device delivering the strip of packages to the transfer station. Thus the transfer device must not only shift the packages physically from the input device to the output device, which can be offset from each other vertically and horizontally, but must also allow the travel speed of the packages to rise to the output-device speed so they can be handed off to it smoothly.

In the known transfer devices for such blister packs, the packs are punched out and drop down on an output conveyor. Thus for a brief time each package is wholly free, not held in place or position by anything. When the package drops basically straight down onto the rapidly moving output conveyor, it can easily be knocked out of alignment as it comes into contact with the output conveyor. The best way to avoid this is to slow travel speed, which action reduces the output of the production line.

OBJECTS OF THE INVENTION

It is therefore an object of the present invention to provide an improved transfer apparatus.

Another object is the provision of such an improved transfer apparatus that overcomes the above-given disadvantages, in particular that is which passes the packages from the input device to the output device without letting go of the packages and while changing their orientation and travel speed so that at each end of the transfer they are picked up and dropped off smoothly.

SUMMARY OF THE INVENTION

A transfer apparatus has according to the invention a drive disk rotatable at a transfer station about a central axis and defining an eccentric axis offset from the central axis. An inner drive shaft centered on the eccentric axis is rotatably journaled in the drive disk at the eccentric axis. An inner arm is fixed to and extends angularly from the inner drive shaft. An outer arm is pivoted at the inner-arm outer end, and a grab is pivoted on the outer-arm outer end. A drive rotates the drive disk about the central axis and thereby orbits the inner arm, the outer arm, and the grab about the central axis. An inner controller changes an inner angle formed between the inner arm and the outer arm, which form a knee lever, and an outer controller changes an outer angle formed between the grab and the outer arm.

This apparatus has the advantage that the package is taken by the grab from the input device and is handed to the output device without ever being released. The two controllers allow the displacement speed and position to be perfectly tailored to the exact requirements. The controller that changes the inner angle can adjust for differences in height of the input and output devices. The controller that changes the outer angle ensures proper orientation of the grab as it picks up the package and of the grab and the package when the package is handed off to the output device.

According to the invention the inner controller has an inner cam disk having a cam formation and an inner cam follower riding on the formation and coupled to the outer arm. Such a cam can very accurately control grab position, and can make a relatively big movement of the grab with high accuracy.

It is also preferably in accordance with the invention when an outer shaft is pivoted at the inner-arm outer end and fixed to the outer arm. Thus the outer cam and the outer cam follower turn this outer shaft.

According to a preferred embodiment of the invention, the outer controller comprises an outer cam disk having a cam formation and an outer cam follower riding on the outer-disk formation and coupled to the outer arm. The outer cam follower is fixed to the outer shaft and therethrough to the outer arm. The inner-disk cam formation is a ridge and the inner cam follower is a pair of rollers flanking the ridge. The outer-disk cam formation is a groove and the outer cam follower is a single roller riding in the groove. With a separate cam controlling the angular position of each of the arms of the knee-lever assembly it in possible to very accurately control the grab position and to effect relatively fact movements of the grab.

For most compact construction of the apparatus, the inner and outer cam disks axially flank the drive disk. The drive shaft projects through the drive disk, and the outer cam follower is to one axial side of the drive disk and the grab is to the other axial side of the drive disk.

The outer controller according to the invention includes a shaft extending along the central axis, not rotatable about the central axis, and rotatably carrying the drive disk and belts interconnecting the shaft and the grab for maintaining the grab at the same orientation relative to the vertical plane regardless of its angular position relative to the central axis. Normally the grab is a downwardly directed suction gripper. Normally according to the invention the grab has a plurality of the suction grippers. The output device is a suction-type belt conveyor leading away from the station.

For maximum throughput, the drive disk carries a plurality of the drive shafts, inner arms, outer arms, and grabs, angularly distributed about the central axis. The drive is a variable-speed servo motor.

The input device can include a stamper at the station for cutting sections out of an incoming package strip, although it is within the scope of the invention for the input device to deliver separate packages one at a time to the transfer station. The controllers operate such that the grab is moved mainly vertically in cooperation with the stamping to lift up cut-out sections of the strip and thereafter in moved mainly horizontally to convey the sections downstream. The servo motor varies the rotation speed of the drive disk in accordance with cycling of the stamper and so as to compensate for the different transport speeds of the input and output devices.

BRIEF DESCRIPTION OF THE DRAWING

The above and other objects, features, and advantages will become more readily apparent from the following description, reference being made to the accompanying drawing in which.

SPECIFIC DESCRIPTION

As seen in FIGS. 1 through 4, a transfer apparatus 1 takes packages 2 arriving from an input device 3 and delivers them to an output device constituted as a conveyor 4. The input device 3 feeds a strip 5 at a lover level LL in a transport direction D to a stamper 6 that cuts the packages 2 out 80 they can be shifted by grabs 7 each formed by a plurality of vertical arms 9 that can fit between belts 10 of the conveyor 4 and that have suction grippers 11 at their lower ends. The packages 2 or strip 5 are fed in the horizontal transport direction D to a central transfer station 8 by the device 3 at a constant low speed V1 (FIG. 3) and the packages 2 are carried in the direction D away from the station 8 by the conveyor 4 at a much higher constant speed V2 at an upper level LU. Thus the transfer is apparatus 1 must not only move the packages vertically from the lower level LL (FIG. 3) of the input device 3 to the upper level LU of the output device 4, but also increase their speed in the direction D from V1 to V2.

The transfer apparatus 1 has a variable speed servomotor 12 (FIG. 2) that can rotate a main drive disk 13 about a horizontal central axis 13A defined by a central nonrotating shaft 28 that rotatably supports the disk 13. Four angularly equispaced inner shafts 14 extend along and are journaled in the disk 13 at eccentric axes 14A parallel to and equiangularly spaced around the central axis 13A. Thus as the drive motor 12 rotates the disk 13 about the axis 13A, the axes 14A will orbit around this axis 13A.

A rigid inner arm or link 15 is fixed on each of the inner shafts 14 and extends radially of the axis 14A from it. An outer shaft 22 is journaled at an axis 22A parallel to the axes 13A and 14A on the outer end of each of the inner arms 15 and in turn carries an outer arm 18 extending radially from the respective axis 22A. A grab shaft 19 is journaled at each axis 19A parallel to the axes 13A, 14A, and 22A on the outer end of each of the outer arms 18 and carries the respective grab 7.

Each outer shaft 22 is provided with a cam-follower arm 16 projecting radially from the respective axis 22A and carrying on its outer end a cam-follower roller 23 engaged in a cam formation or groove 21 formed in a face of a stationary can disk 20. The groove 21 extends around the axis 13A and is of noncircular shape. Thus as each roller 23 rides around its groove 21, the respective outer arm 18 will be pivoted about the axis 22A.

In addition each inner shaft 14 carries a Y-shaped cam-follower arm 17 projecting radially from the respective axis 14A and carrying on its outer ends a pair of cam-follower rollers 26 that engage opposite faces 27 of a cam formation or ridge 25 formed on a face of another stationary cam disk 24 an the opposite face of the drive disk 13. Thus as the rollers 26 ride around the ridge 25, the respective inner arm 15 will be pivoted about the axis 14A. The ridge 25 extends around the axis 13A also and is also of noncircular shape. These two cams 20 and 24 therefore determine the angle between the inner and outer arms 15 and 18 and thereby establish the radial distance of the axes 19A from the axis 13A.

The grabs 9 are maintained vertical by respective sets of belts 30 spanned over wheels 29 rotatable about the axes 14A and 22A, the innermost belt 30 of each set being engaged over the nonrotating shaft 28 and the outermost belt 30 of each set being engaged around the respective shaft 19 so that the shafts 19 remain in the same angular orientation with respect to the vertical or horizontal regardless of their angular position about the axis 13A.

Figure 1:
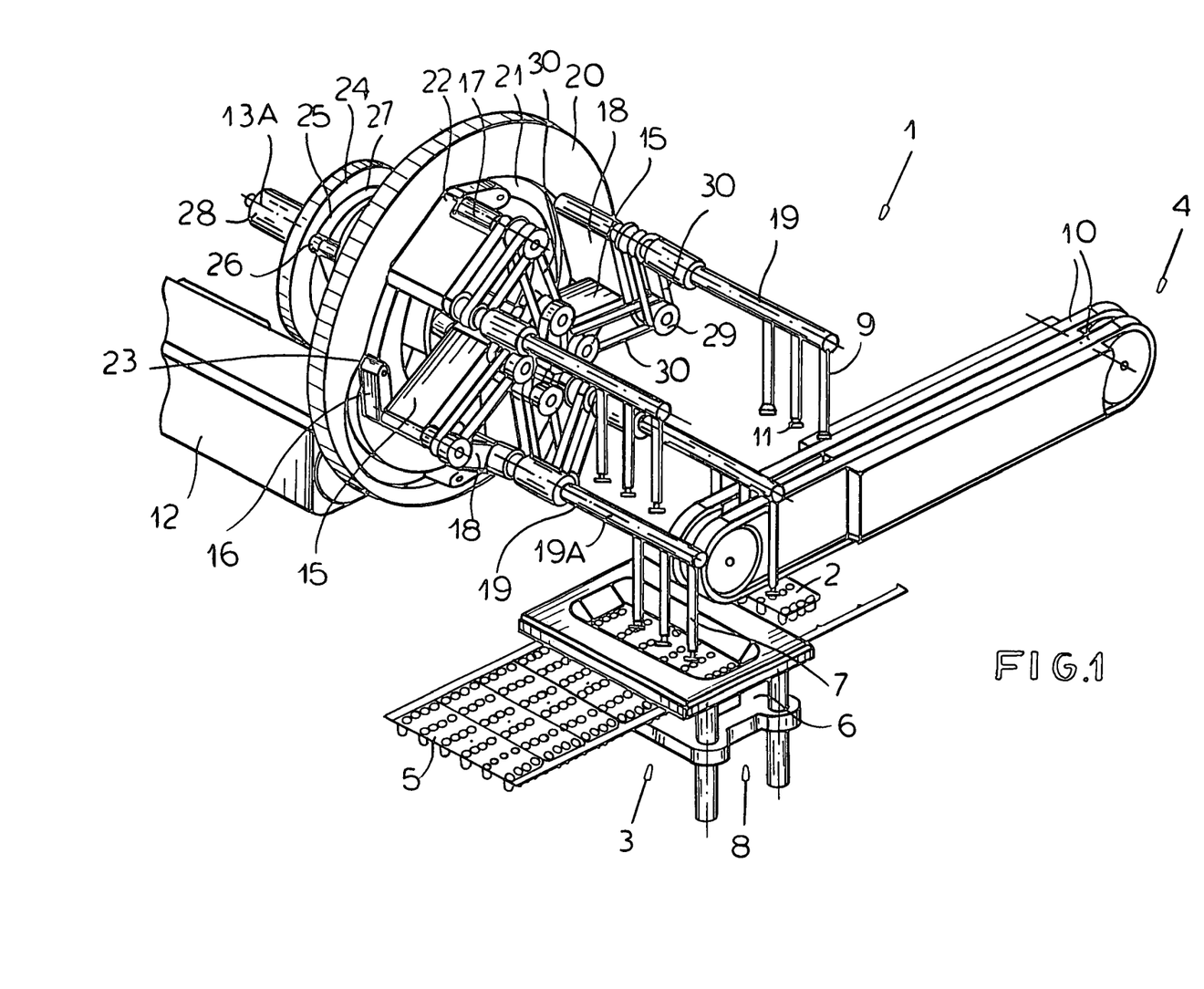
FIG. 1 is a perspective view of the transfer apparatus according to the invention.
Figure 2:
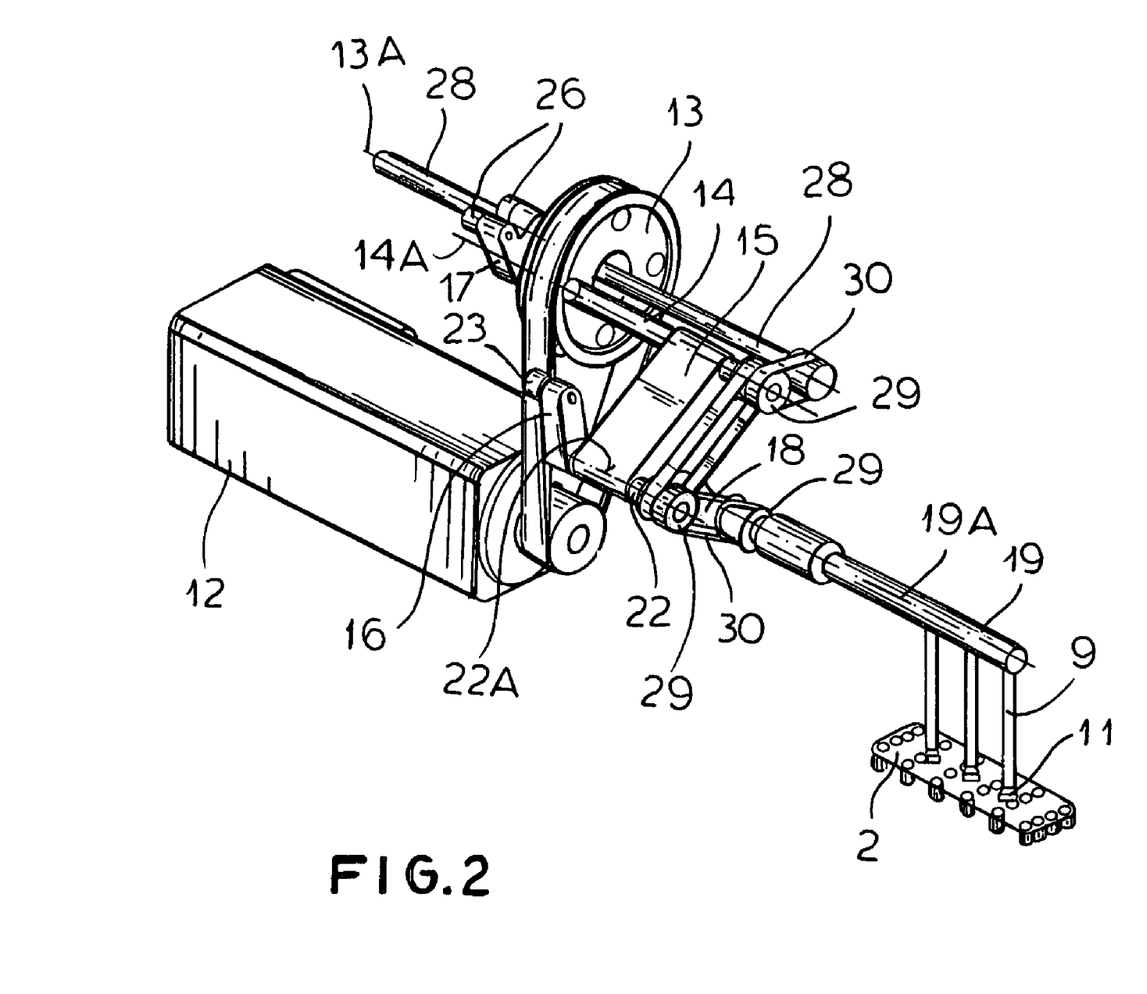
FIG. 2 is a perspective view of a detail of the apparatus, parts removed for clarity of view.
Figure 3:
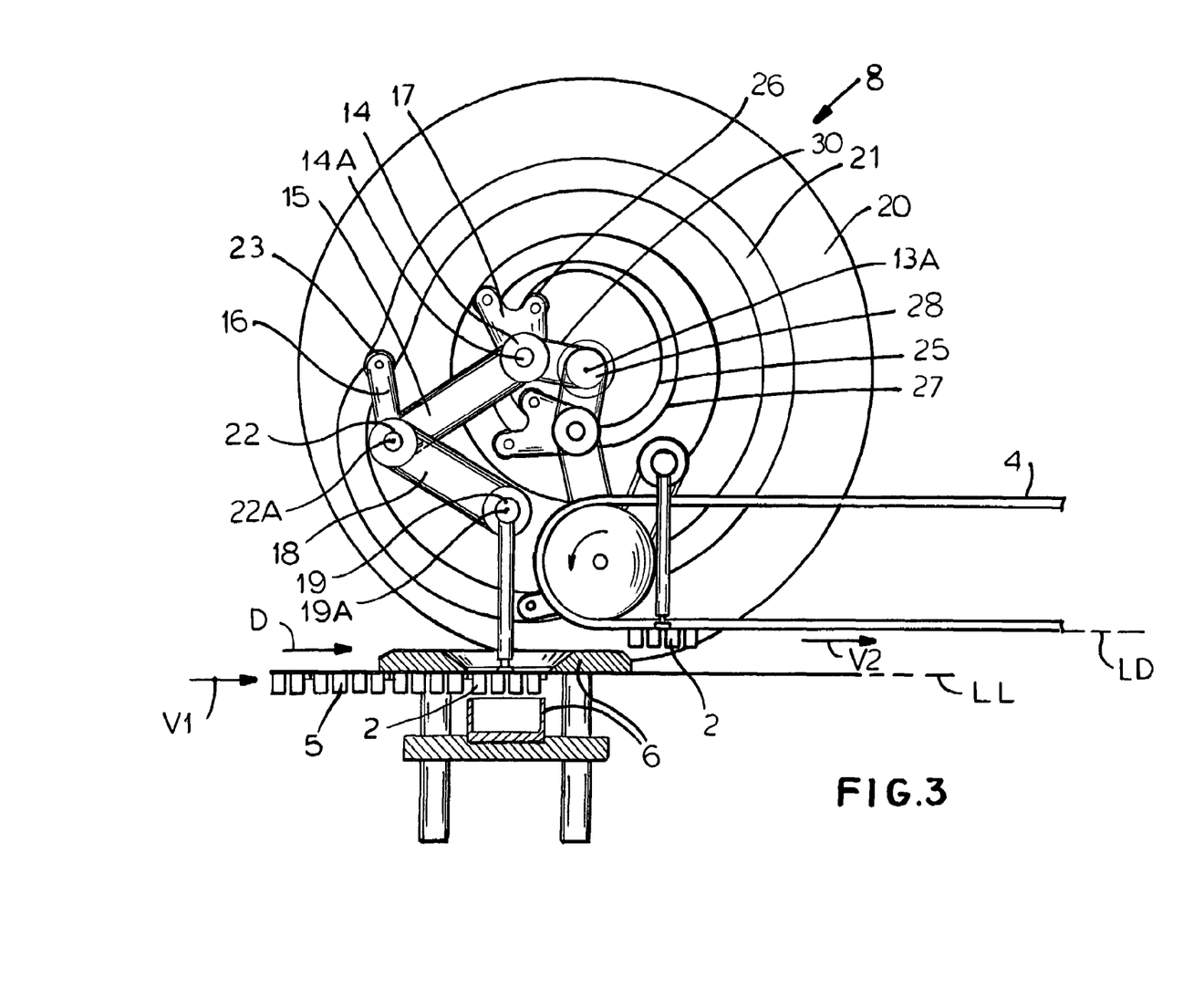
FIG. 3 is an end view of a detail of the apparatus, parts removed for clarity of view.
Figure 4:
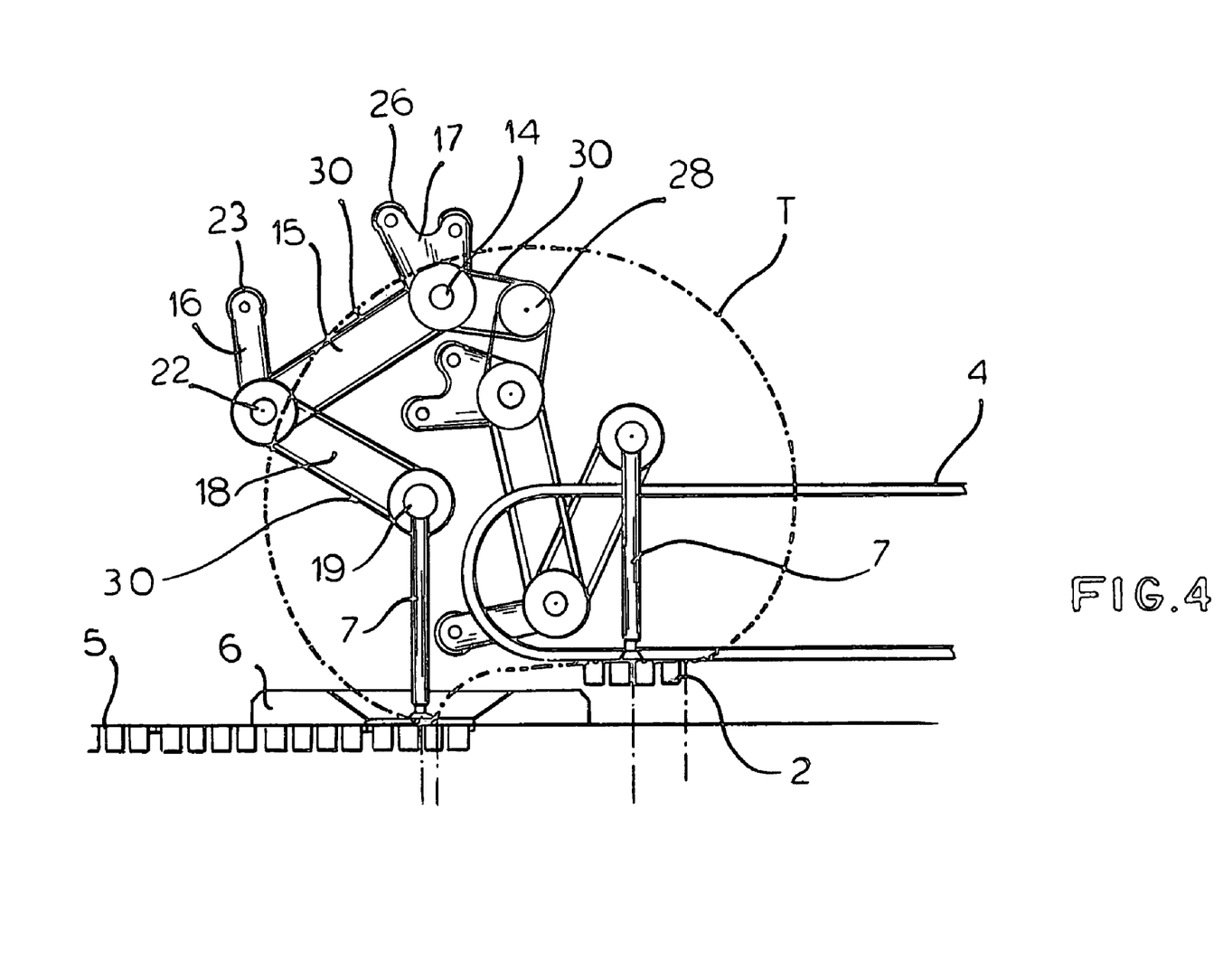
FIG. 4 is a largely schematic end view showing the operation of the apparatus.
Figure 5:
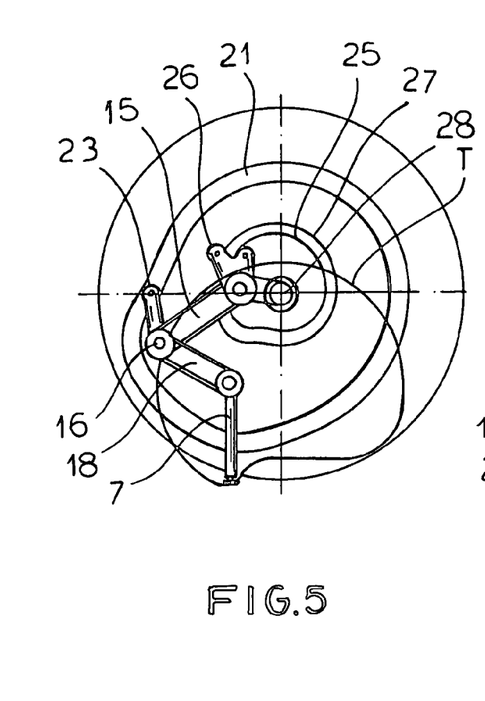
FIGS. 5 through 10 are small-scale diagrams illustrating the operation of the apparatus.
Figure 6:
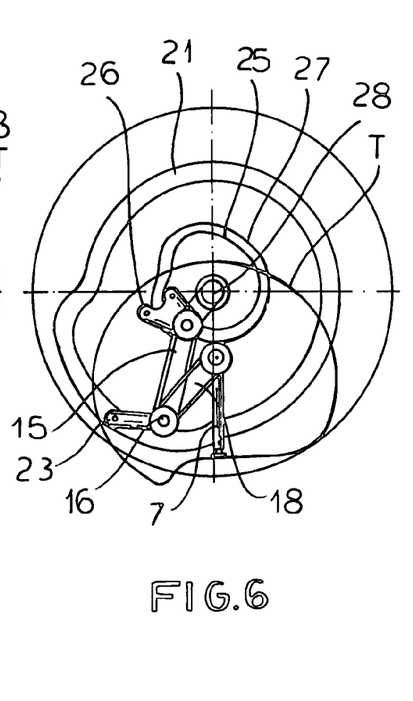
Figure 7:
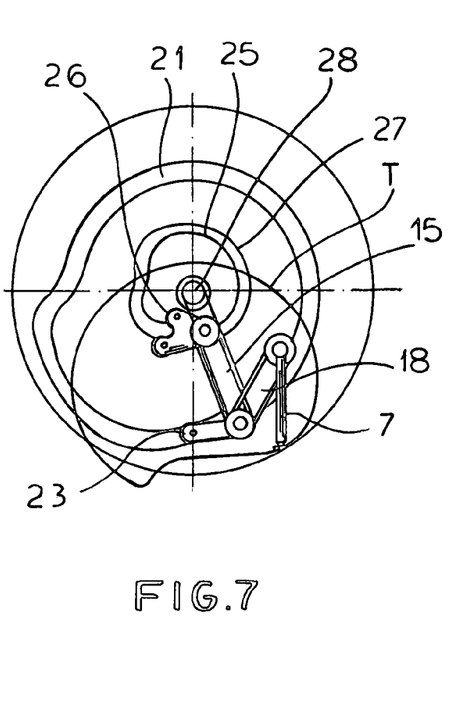
Figure 8:
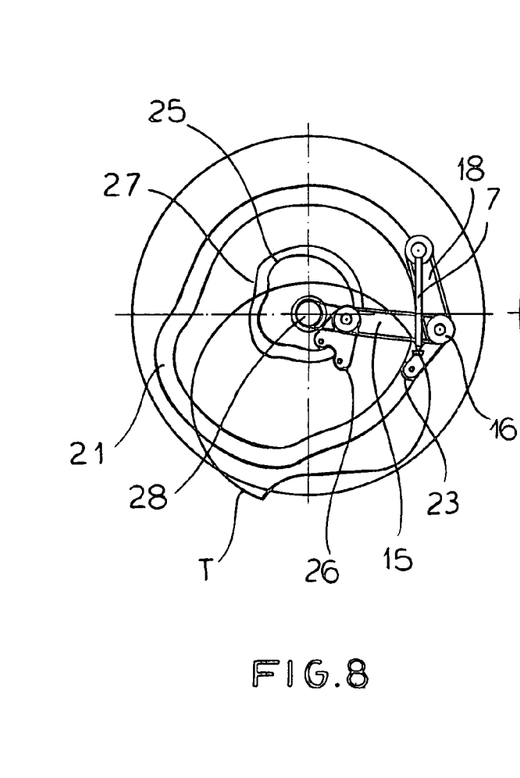
Figure 9:
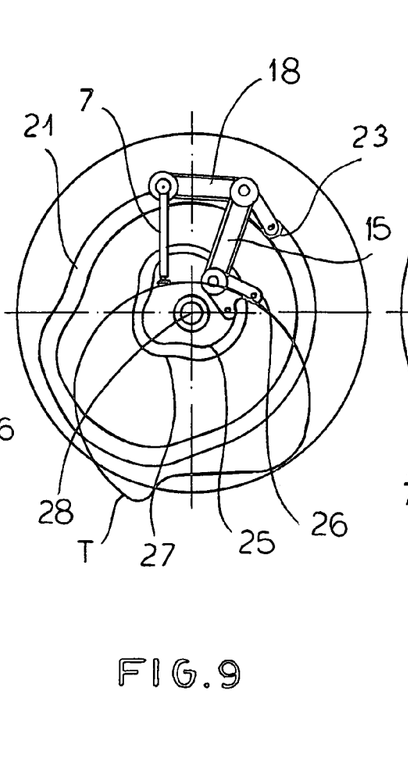
Figure 10:
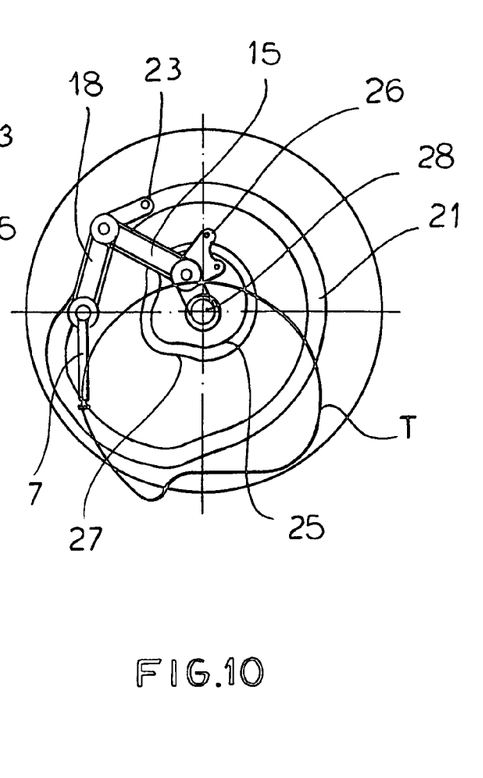

As shown in FIGS. 5 through 10, the cam formations 21 and 25 are shaped such that the suction grippers of each grab 7 are pressed down on one of the packages 2 just as the stamper 6 cuts it free from the strip 5 (FIG. 5). Then (FIG. 6) the grab 7 moves mainly vertically upward to pull the freed package 2 up through the upper die to the upper level LU. Then (FIG. 7) the grabs 7 move mainly horizontally in the direction D while accelerating up to speed V2 to transfer the picked-up package 2 to the conveyor 4. Finally (FIGS. 8, 9, and 10) the grabs 7 simply orbit around the axis 13A to restart the process, with no particular radial or angular movement as the respective portions of the cams 21 and 25 are formed an circle segments centered on the axis 13A.

Figure 11:
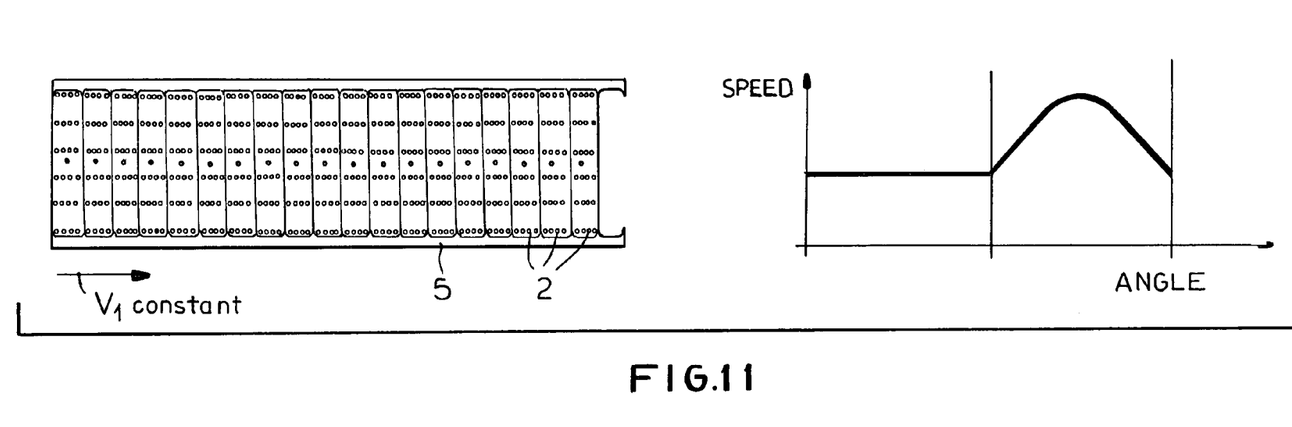
FIGS. 11, 12, and 13 are views of different packages according to the invention and the operating speeds of the system.
Figure 12:
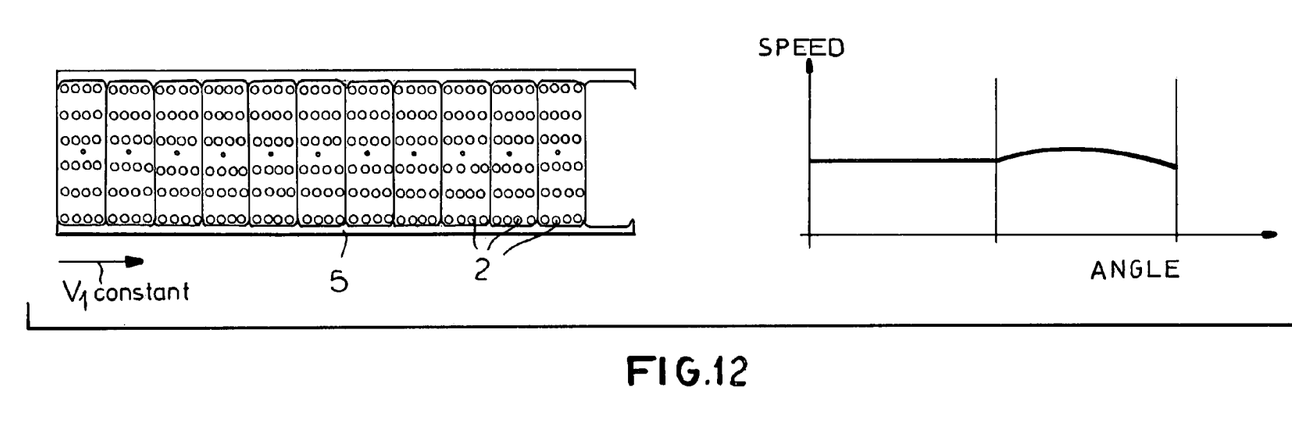
Figure 13:
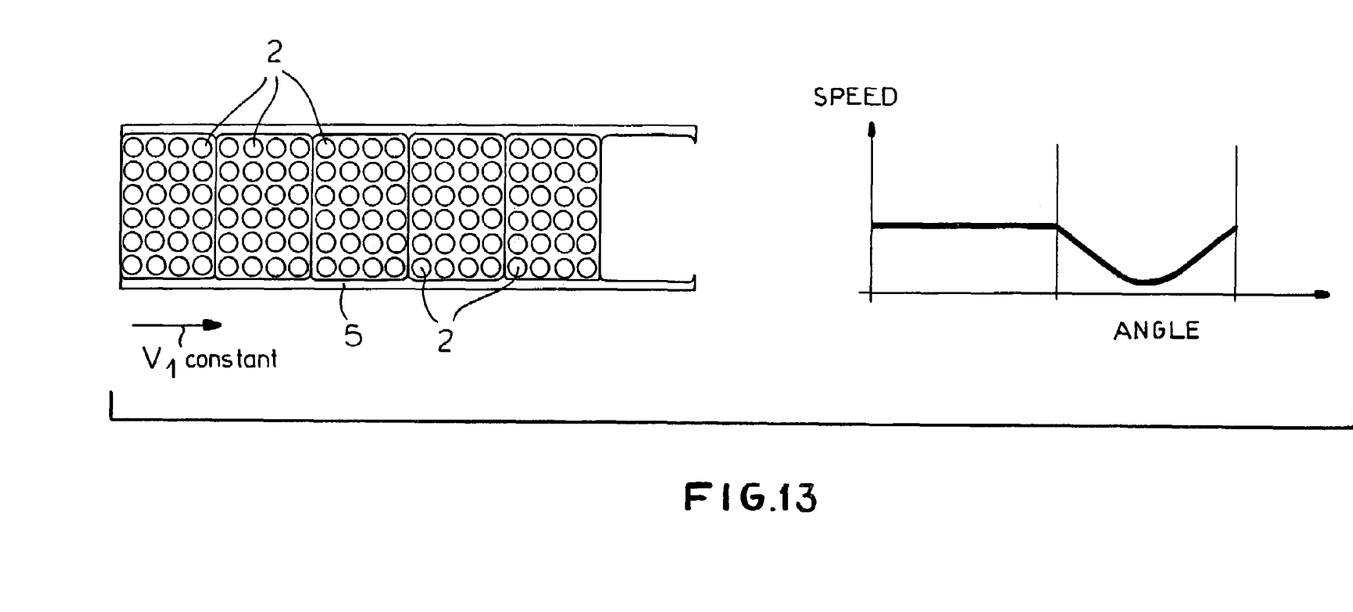

The variation of angular speed is shown in FIGS. 11, 12, and 13 where packages 2 of different lengths are shown on the left, and on the right the speed curve relative to angular displacement for the particular package 2 is shown. The time for a quarter revolution of the disk 13, since there are four grabs 7 on the disk 13, is set to be equal to the cycling time for the stamp 6, and the speed in the direction D of the grab 7 when they are in contact with the package 2 must change from V1 to V2. Thus the grabs 7 move along the annular and noncircular path shown at T in dot-dash lines in FIG. 4.

We claim:

1. A transfer apparatus comprising:
    a drive disk rotatable at a transfer station about a central axis and defining an eccentric axis offset from the central axis;
    an inner drive shaft centered on the eccentric axis and rotatably journaled in the drive disk at the eccentric axis;
    an inner arm fixed to and extending angularly from the inner drive shaft and having an outer end;
    an outer arm pivoted at the inner-arm outer end and having an outer end;
    a grab pivoted on the outer-arm outer end;
    drive means for rotating the drive disk about the central axis and thereby orbiting the inner arm, the outer arm, and the grab about the central axis;
    inner control means including
        an inner cam disk having a cam formation, and
        an inner cam follower riding on the formation and coupled to the outer arm
    for changing an inner angle formed between the inner arm and the outer arm; and
    outer control means
        an outer cam disk having a cam formation, and
        an outer cam follower riding on the outer-disk formation and coupled to the outer arm
    for changing an outer angle formed between the inner arm and the outer arm, the inner and outer cam disks axially flanking the drive disk.

2. The transfer apparatus defined in claim 1, further comprising
    an outer shaft pivoted at the inner-arm outer end and fixed to the outer arm.

3. The transfer apparatus defined in claim 2 wherein the outer cam follower is fixed to the outer shaft and therethrough to the outer arm.

4. The transfer apparatus defined in claim 1 wherein the inner-disk cam formation is a ridge and the inner cam follower is a pair of rollers flanking the ridge.

5. The transfer apparatus defined in claim 1 wherein the drive shaft projects through the drive disk, the inner cam follower being to one axial side of the drive disk and the grab being to the other axial side of the drive disk.

6. The transfer apparatus defined in claim 1 wherein the outer control means further includes
a central shaft forming part of the stationary support, extending along the central axis, not rotatable about the central axis, and rotatably carrying the drive disk, and
means including belts interconnecting the central shaft and the grab for maintaining the grab at the same orientation relative to the vertical plane regardless of its angular position relative to the central axis.

7. The transfer apparatus defined in claim 1 wherein the grab includes a suction gripper.

8. The transfer apparatus defined in claim 7 wherein the grab has a plurality of the suction grippers.

9. The transfer apparatus defined in claim 1, further comprising
a suction-type belt conveyor leading away from the station.

10. The transfer apparatus defined in claim 1 wherein the drive disk carries a plurality of the drive shafts, inner arms, outer arms, and grabs, angularly distributed about the central axis.

11. The transfer apparatus defined in claim 1 wherein the drive means is a variable-speed servo motor.

12. The transfer apparatus defined in claim 11, further comprising
means including a stamping apparatus at the station for cutting sections out of an incoming package strip.

13. The transfer apparatus defined in claim 12 wherein the control means operate such that the grab is moved mainly vertically in cooperation with the stamping operates to lift up cut-out sections of the strip and thereafter is moved mainly horizontally to convey the sections downstream.

14. The transfer apparatus defined in claim 12 wherein the servo motor varies the rotation speed of the drive disk in accordance with cycling of the stamping apparatus.

* * * * *